(12) United States Patent
Gordley

(10) Patent No.: US 6,294,785 B1
(45) Date of Patent: Sep. 25, 2001

(54) INFRARED SENSOR RESPONSE CALIBRATION USING ATMOSPHERIC LIMB EMISSION MEASUREMENTS

(75) Inventor: Larry L. Gordley, Williamsburg, VA (US)

(73) Assignee: G & A Technical Software Inc., Newport News, VA (US)

( * ) Notice: Subject to any disclaimer, the term of this patent is extended or adjusted under 35 U.S.C. 154(b) by 0 days.

(21) Appl. No.: 09/392,212

(22) Filed: Sep. 8, 1999

(51) Int. Cl.⁷ .................................. G01J 5/52; G01J 1/10
(52) U.S. Cl. .................................. 250/339.09; 250/341.5; 250/339.01; 356/230
(58) Field of Search ........................ 250/339.09, 339.01, 250/340, 341.5, 252.1; 356/230

(56) References Cited

U.S. PATENT DOCUMENTS

| | | | |
|---|---|---|---|
| 4,746,976 | * | 5/1988 | Kamel et al. ........................ 358/103 |
| 5,319,968 | * | 6/1994 | Billing-Ross et al. .............. 73/178 R |
| 5,325,171 | * | 6/1994 | Shimizu .............................. 356/230 |
| 5,354,987 | * | 10/1994 | MacPherson ........................ 250/252.1 |
| 6,023,061 | * | 2/2000 | Bodkin ................................ 250/332 |
| 6,175,113 | * | 1/2001 | Ashley et al. ...................... 250/334 |
| 6,184,529 | * | 2/2001 | Contini ............................... 250/347 |

* cited by examiner

Primary Examiner—Constantine Hannaher
Assistant Examiner—Albert Gagliardi
(74) Attorney, Agent, or Firm—Peter J. Van Bergen

(57) ABSTRACT

A method is presented for calibrating an infrared sensing device while in an orbit above a celestial body. The infrared sensing device measures a signal profile proportional to radiance emission from the atmospheric limb region in each of a plurality of spectral bandpass regions. The radiance emission from each of the spectral bandpass regions is primarily due to a gas in the atmospheric limb region. The gas must 1) have a known mixing ratio as a function of pressure, 2) cause spectral opacity to be different for each spectral bandpass region, and 3) cause spectral opacity to be non-linearly proportional to concentration of the gas in the atmospheric limb region over at least a portion of the signal profile. A temperature/pressure profile that is indicative of the signal profiles is determined. The temperature/pressure profile is indicative of absolute radiance emission which is then used to calibrate the infrared sensing device.

18 Claims, 2 Drawing Sheets

INFRARED SENSOR RESPONSE CALIBRATION USING ATMOSPHERIC LIMB EMISSION MEASUREMENTS

FIELD OF THE INVENTION

The invention relates generally to the calibration of infrared sensors, and more particularly to a method of calibrating an infrared sensor positioned in orbit above a celestial body using atmospheric limb emission measurements.

BACKGROUND OF THE INVENTION

Infrared sensors are used onboard orbiting platforms (e.g., satellites) for a variety of applications. These sensors must be periodically calibrated. This is especially important when the sensors are used onboard platforms scheduled for long deployment. Currently, an onboard calibrated reference emission source must be provided and used for sensor calibration. The reference emission source must be a stable source and/or requires monitoring. Further, stable optical path(s) used by these sensors to view the reference emission source must be provided. The reference emission system must be calibrated on the ground and then mounted to withstand the severe launch stresses it will experience and in a way that allows it to exhibit the same performance in orbit as during its ground calibration.

SUMMARY OF THE INVENTION

Accordingly, it is an object of the present invention to provide a method of calibrating an infrared sensing device.

Another object of the present invention is to provide a method of calibrating an infrared sensing device in an orbiting vehicle.

Yet another object of the present invention is to provide an accurate long-term method of calibrating an orbiting infrared sensing device.

Still another object of the present invention is to provide a method of calibrating an orbiting vehicle's infrared sensing device without the use of an onboard reference source.

Other objects and advantages of the present invention will become more obvious hereinafter in the specification and drawings.

In accordance with the present invention, a method is presented for calibrating an infrared sensing device. The method uses an infrared sensing device in an orbit above a celestial body (e.g., earth) having an atmosphere and a known gravitational field. The infrared sensing device is focused at an atmospheric limb region of the atmosphere. The infrared sensing device is used to measure a signal profile (i.e., a signal as a function of the sensor's elevation angle) proportional to radiance emission from the atmospheric limb region in each of a plurality of spectral bandpass regions. The radiance emission from each of the spectral bandpass regions is primarily due to a gas in the atmospheric limb region. The gas must 1) have a known mixing ratio as a function of pressure, 2) cause spectral opacity to be different for each spectral bandpass region, and 3) for at least one of the spectral bandpass regions, cause spectral opacity to be non-linearly proportional to concentration of the gas in the atmospheric limb region over at least a portion of the signal profile. A temperature/pressure profile indicative of the signal profiles is determined. This temperature/pressure profile is indicative of absolute radiance emission from the atmospheric limb region, which is then used as a calibrated external source for calibrating the infrared sensing device.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
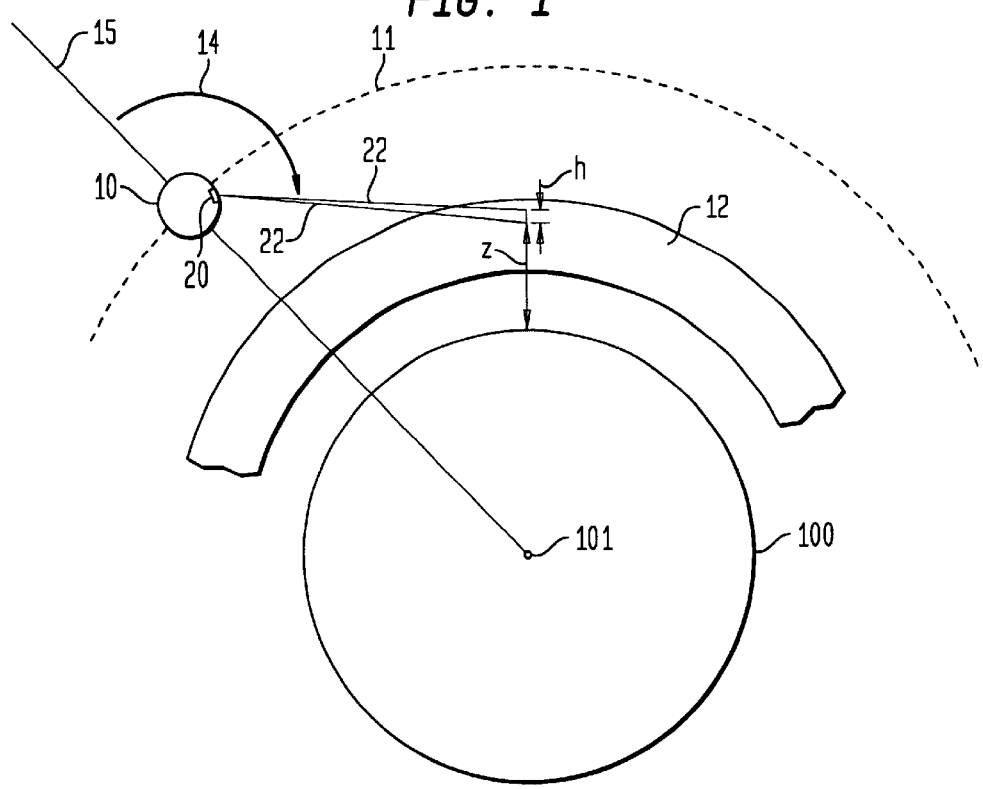
FIG. 1 is a schematic representation of earth limb geometry used in the method of calibrating an infrared sensing device in accordance with the present invention.

Referring now to the drawings, and more particularly to FIG. 1, an orbiting vehicle 10 such as a satellite is shown at a point in its orbit 11 about the earth 100. While the present invention will be described by way of example using the earth and its atmosphere, it is to be understood that the method of the present invention can be employed using any celestial body having an atmosphere and a known gravitational field. As is well known in the art, a celestial body's gravitational field can be determined using orbital mechanics and position of the orbiting vehicle.

In terms of the present invention, simplicity as well as the best calibration accuracy are achieved when an atmospheric limb region 12 used in the calibration process exhibits spherical uniformity at the pressure levels therein. This is true for the earth 100 or any other celestial body. For the earth, such atmospheric conditions are common. For example, such conditions occur nearly continuously in the stratosphere over more tropical portions of the earth which typically lie between the earth's 20° north and 20° south latitude lines. The appropriate atmospheric conditions are also very common at other latitudes and seasons as well as in other atmospheric regions such as the troposphere and mesosphere.

Figure 2:
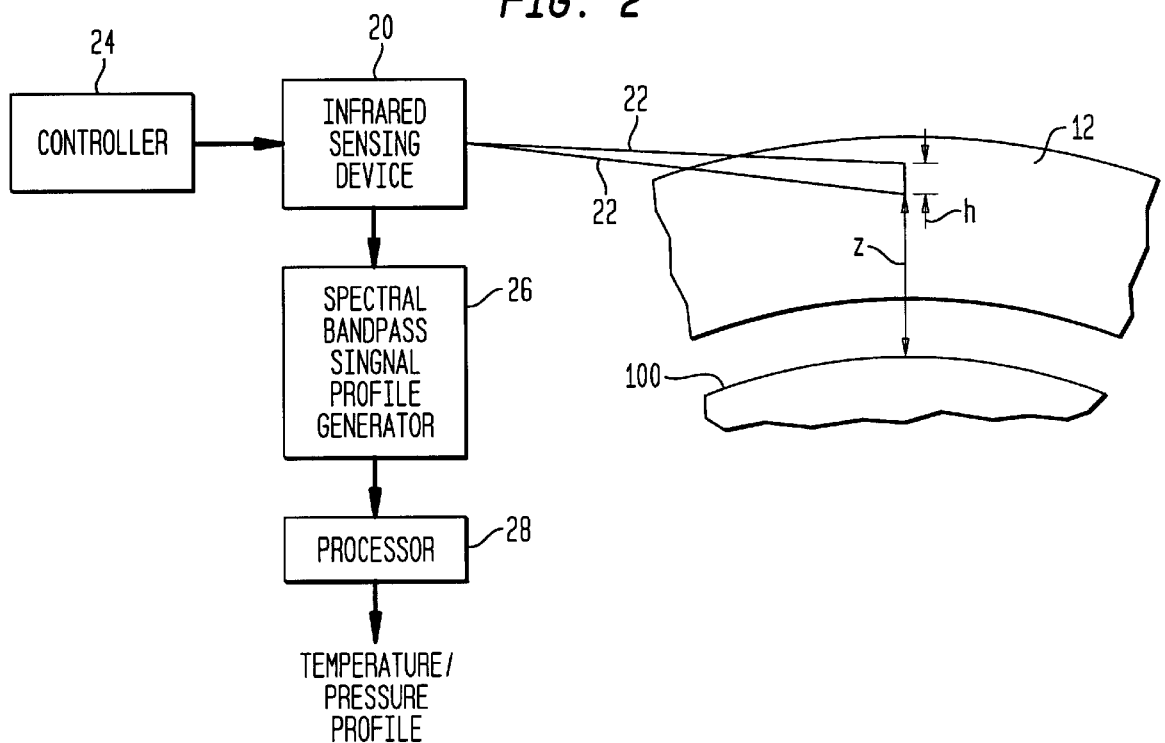
FIG. 2 is a block diagram of the system used to carry out the method of the present invention.

One system that could be maintained onboard orbiting vehicle 10 for carrying out the present invention is illustrated in FIG. 2. An infrared sensing device to be calibrated by the present invention is referenced by numeral 20 in FIGS. 1 and 2. Infrared sensing device 20 (e.g., any conventional single infrared sensor or plurality of infrared sensors operating simultaneously or sequentially) has a known field-of-view 22 that is focused on a portion of atmospheric limb region 12. Infrared sensing device 20 can be a linear-response instrument or a non-linear response instrument that is accurately calibrated for linearity.

A controller 24 is coupled to infrared sensing device 20 to, for example, cause field-of-view 22 to be scanned through a range of elevation angle 14 (i.e., measured with respect to a line 15 passing through vehicle 10 and the center 101 of earth 100) so that a large portion of interest of atmospheric limb region 12 is considered by the present invention. However, if the portion of interest can be adequately imaged/captured by field-of-view 22, the signal profile can be measured without such scanning. It has been found that at the vertical altitude Z (i.e., measured perpendicular to the tangent that field-of-view 22 makes with atmospheric limb region 12), a resolution h of field-of-view 22 projected along its view direction to atmospheric limb region 12 should be less than approximately 10 kilometers. Given adequate signal strength, smaller values of resolution h provide more accurate results. Note that the absolute accuracy of vertical altitude Z is not that critical as long as measurements are made in atmospheric limb region 12 and resolution h is accurately known.

Since infrared sensing device 20 is uncalibrated, it measures signals as a function of elevation angle 14 proportional to radiance emission from atmospheric limb region 12 falling in the projection h of field-of-view 22 on atmospheric limb region 12. Thus, the measured signals as a function of vertical altitude Z in atmospheric limb region 12 provide a signal profile that is proportional to the radiance emission profile as a function of vertical altitude Z.

Signal profiles must be developed for at least two spectral bandpass regions in which a gas of known mixing ratio as a function of pressure is the primary cause of radiance emission from atmospheric limb region 12. The greater the number of spectral bandpass regions evaluated, the greater the calibration accuracy with the tradeoff of greater instrument and computational complexity. To develop signal profiles for a plurality of spectral bandpass regions, infrared sensing device 20 is coupled to a spectral bandpass signal profile generator 26 which can be implemented in a variety of ways. For example, signal profile generator 26 could embody different spectral filters. Alternatively, incoming radiation could be optically split and directed to different detectors, each of which could be sensitive to a different spectral bandpass region. Accordingly, it is to be understood that the method/system for generating the signal profiles in the different spectral bandpass regions is not a limitation of the present invention. Likewise, the spectral resolution of the bandpass is not a limitation of the present invention. For example, effective bandpasses can be constructed from high resolution systems during data processing that provide the necessary spectral conditions of opacity and specific gas emission.

In addition to knowing the gas's mixing ratio as a function of pressure, the spectral opacity due to the gas must be different for each of the spectral bandpass regions. Also, spectral opacity must be non-linearly proportional to the gas's concentration for at least one of the spectral bandpass regions over at least a portion of the measured signal profile.

For the illustrative earth example used to describe the present invention, a number of gases satisfy the above-noted criteria. These gases include, but are not limited to, carbon dioxide ($CO_2$) and oxygen ($O_2$) in the troposphere and stratosphere, and nitrous oxide ($N_2O$) and methane ($CH_4$) in certain regions of the troposphere. For other celestial bodies, other gases could be used as long as the above-described mixing ratio and spectral requirements were met.

The signal profiles for the plurality of spectral bandpass regions are processed by a processor 30 to output a temperature/pressure profile that, as is known in the art, is indicative of the absolute radiance emission from atmospheric limb region 12 given mixing ratio and spectral properties of the emission source. The absolute radiance emission is used as the reference emission source for calibrating infrared sensing device 10.

Processor 30 can be programmed in a variety of ways to determine the temperature/pressure profile using the signal profiles for the plurality of spectral bandpass regions. In general, since celestial atmospheres such as the earth's atmosphere characteristically have temperature/pressure profiles that are in hydrostatic equilibrium owing to requirements of atmospheric physics and the universal gas law, there is a temperature/pressure profile indicated by (or corresponding to) the measured signal profiles associated with all of the spectral bandpass regions. Thus, it is the task of processor 30 to find a temperature/pressure profile "solution" that is indicative of the measured signal profiles. Note that, in practice, the existence of measurement and other systematic errors mean that a small range of solutions will be indicative of the measured signal profiles. However, it has been found that this small range of solutions induces insignificant errors in the calibration objective when the above-described conditions of the process are followed. Accordingly, any solution in the small range is a temperature/pressure profile that is indicative of the measured signal profiles.

Figure 3:
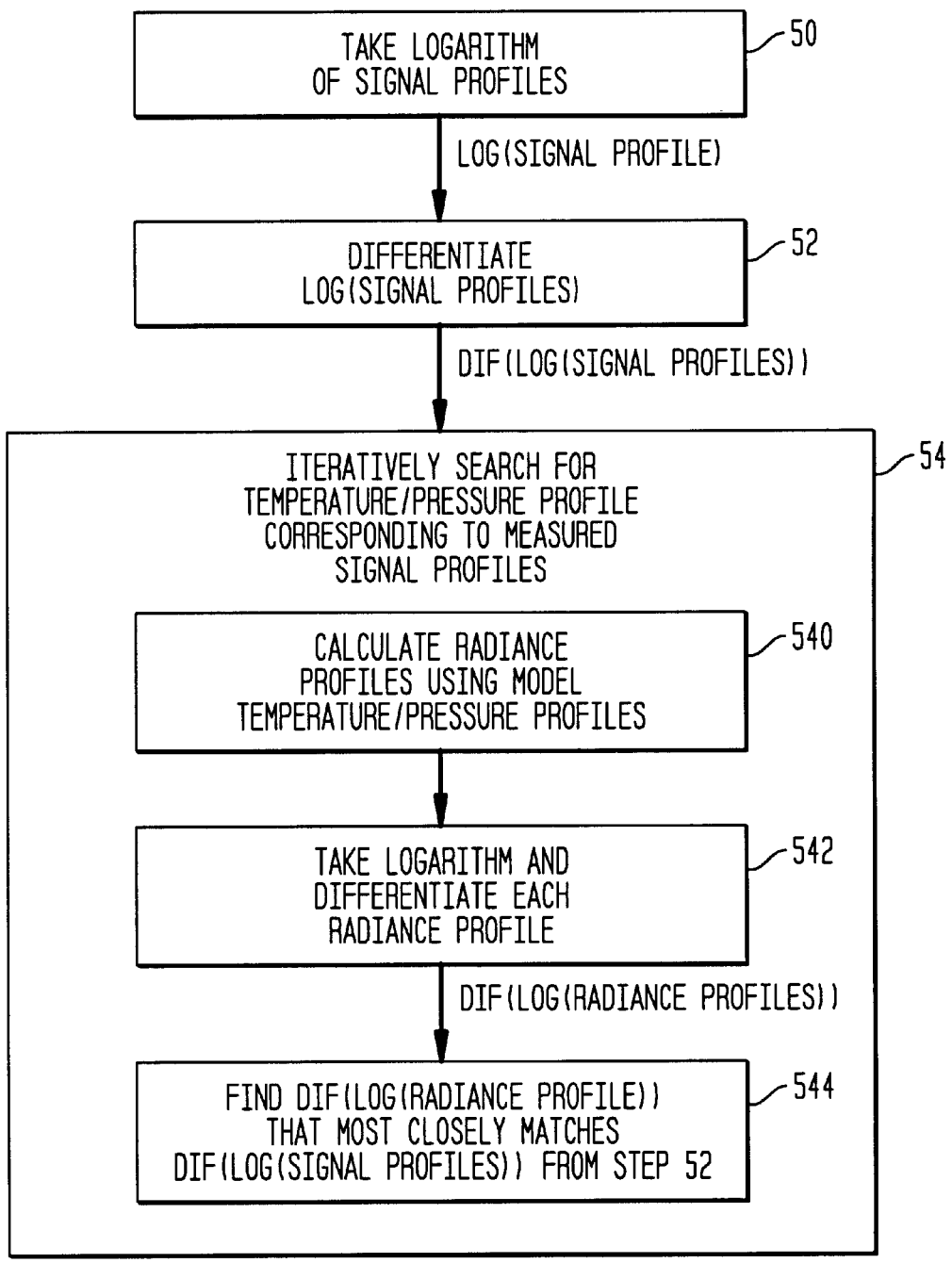
FIG. 3 is a top level flow diagram of the steps used to determine the temperature/pressure profile of the atmospheric limb region in accordance with one embodiment of the present invention.

By way of example, one method of solving for the temperature/pressure profile given measured signal profiles for a plurality of spectral bandpass regions will now be described with the aid of FIG. 3. While a variety of other methods can be used, this method has the advantage of being independent of calibration constants and, therefore, does not require iterative retrieval of calibration constants.

As a first step, the logarithm of the signal profile for each spectral bandpass region is taken at step 50. The resulting logarithmic signal profiles ("LOG(signal profiles)") are differentiated at step 52 with respect to vertical altitude Z in atmospheric limb region 12. This mathematically removes the dependence on calibration constants.

The differentiated logarithmic signal profiles ("DIF(LOG (signal profiles))") are then used in an iterative process at step 54 to search for the temperature/pressure profile satisfying the measured signal profiles. For example, for a first of the spectral bandpass regions, a succession of temperature/pressure profiles can be passed to a model that calculates a corresponding succession of radiance profiles at step 540. Step 540 could be carried out as follows. At vertical altitudes $Z_1$ and $Z_2$ where all spectral bandpass regions exhibit linear opacity, guesses are made for corresponding pressures $P_1$ and $P_2$ to thereby uniquely define a mean temperature T between $Z_1$ and $Z_2$ due to the hydrostatic relationship between $P_1$ and $P_2$. The radiance profiles at $Z_1$ and $Z_2$ are then modeled. The logarithm of each radiance profile is formed and differentiated at step 542 ("DIF(LOG(radiance profiles))") in order to be in the same format as the output from step 52. The search process at step 544 would then simply involve iteratively modifying the temperature/pressure profile (by modifying $P_2$) until the resulting differentiated logarithmic radiance profiles closely matched the differentiated logarithmic signal profiles from step 52. This process is repeated for successively lower vertical altitudes for the first of the spectral bandpass regions. Once a temperature/pressure profile has been found for the first of the spectral bandpass regions, the differentiated logarithmic radiance profiles ("DIF(LOG(radiance profiles))") are modeled for the other spectral bandpass regions and are compared to the corresponding differentiated logarithmic signal profiles ("DIF(LOG(signal profiles))"). The pressure $P_1$ is changed and the complete process is repeated until the value of $P_1$ is found that gives the best comparison. The final iteration establishes the solution temperature/pressure profile. The above-described process has been used successively in tests of the present invention using actual satellite data.

While the above-described solution search has the advantage of being independent of calibration constants, it is to be understood that a variety of solution methods can be used to determine a temperature/pressure profile most indicative of the signal profiles measured by infrared sensing device 20.

The advantages of the present invention are numerous. Absolute calibration of an orbiting infrared sensing device is achieved using radiance emission from a celestial body's atmospheric limb. Thus, orbiting infrared sensing devices can now be calibrated accurately without the need for any onboard reference emission source or, therefore, any of the equipment used to monitor, mount, stabilize, etc. such an onboard reference emission source. No special optical viewing path need be provided for calibration as the sensing device can be continuously calibrated through its normal viewing configuration. Arrays of similar orbiting devices can be cross-calibrated using a common external source.

An infrared sensing device calibrated in accordance with the present invention can be used in a variety of ways. In the case where a high-emissivity on-board reference emission source is still included, the calibrated infrared sensing device can be used to infer output temperature of the reference emission source and, therefore, effectively calibrate the reference emission source. This then eliminates the need for laboratory calibration of the reference emission source and/or the need for stability of the reference emission source.

Although the invention has been described relative to a specific embodiment thereof, there are numerous variations and modifications that will be readily apparent to those skilled in the art in light of the above teachings. For example, the number of spectral bandpass regions used can be increased or decreased as accuracy or computational efficiency requirements dictate. Because the present invention works independently of the particular gas, the present invention works with a variety of different infrared sensing devices. Further, the present invention can be used even in atmospheric limb regions that do not exhibit spectral uniformity. In such instances, an array of measured signal profiles in correspondence with atmospheric pressure gradients would have to be measured/processed. It is therefore to be understood that, within the scope of the appended claims, the invention may be practiced other than as specifically described.

What is claimed as new and desired to be secured by letters patent of the united states is:

1. A method of calibrating an infrared sensing device, comprising the steps of:
    providing an infrared sensing device in an orbit above a celestial body having an atmosphere and a known gravitational field;
    focusing said infrared sensing device at an atmospheric limb region of said atmosphere;
    measuring, using said infrared sensing device, a signal profile proportional to radiance emission from said atmospheric limb region in each of a plurality of spectral bandpass regions, wherein said radiance emission from each of said plurality of spectral bandpass regions is primarily due to a gas in said atmospheric limb region, said gas having a known mixing ratio as a function of pressure, wherein spectral opacity due to said gas is different for each of said plurality of spectral bandpass regions, and wherein, for at least one of said plurality of spectral bandpass regions, said spectral opacity is non-linearly proportional to concentration of said gas in said atmospheric limb region over at least a portion of said signal profile;
    determining a temperature/pressure profile that is indicative of said signal profiles, wherein said temperature/pressure profile is indicative of absolute radiance emission from said atmospheric limb region; and
    using said absolute radiance emission to calibrate said infrared sensing device.

2. A method according to claim 1 wherein said infrared sensing device has a known field-of-view, and wherein said step of measuring includes the step of scanning said infrared sensing device through a vertical elevation angle such that said known field-of-view traverses said atmospheric limb region.

3. A method according to claim 2 wherein said known field-of-view has a vertical resolution that is less than approximately 10 kilometers when said known field-of-view is projected to said atmospheric limb region.

4. A method according to claim 1 wherein said celestial body is the earth.

5. A method according to claim 4 wherein said gas is selected from the group consisting of carbon dioxide, oxygen, nitrous oxide and methane.

6. A method according to claim 1 wherein said atmospheric limb region exhibits spherical uniformity at pressure levels within said atmospheric limb region.

7. A method according to claim 1 wherein said celestial body is the earth and said atmospheric limb region is selected from the group consisting of the stratosphere, troposphere and mesosphere.

8. A method according to claim 1 wherein said step of determining comprises the steps of:
    taking the logarithm of said signal profiles to form a corresponding plurality of logarithmic signal profiles;
    differentiating, with respect to altitude in said atmospheric limb region, each of said plurality of logarithmic signal profiles to form a corresponding plurality of differential logarithmic signal profiles; and
    using said plurality of differential logarithmic signal profiles to determine said temperature/pressure profile that is uniquely indicative of said signal profiles.

9. A method of calibrating an infrared sensing device, comprising the steps of:
    providing an infrared sensing device above the earth;
    focusing said infrared sensing device at an atmospheric limb region in the stratosphere that exhibits spherical uniformity at all pressure levels thereof;
    measuring, using said infrared sensing device, a signal profile proportional to radiance emission from said atmospheric limb region in each of a plurality of spectral bandpass regions, wherein said radiance emission from each of said plurality of spectral bandpass regions is primarily due to a gas in said atmospheric limb region, said gas having a known mixing ratio as a function of pressure, wherein spectral opacity due to said gas is different for each of said plurality of spectral bandpass regions, and wherein, for at least one of said plurality of spectral bandpass regions, said spectral opacity is non-linearly proportional to concentration of said gas in said atmospheric limb region over at least a portion of said signal profile;
    determining a temperature/pressure profile that is indicative of said signal profiles, wherein said temperature/pressure profile is indicative of absolute radiance emission from said atmospheric limb region; and
    using said absolute radiance emission to calibrate said infrared sensing device.

10. A method according to claim 9 wherein said infrared sensing device has a known field-of-view, and wherein said step of measuring includes the step of scanning said infrared sensing device through a vertical elevation angle such that said known field-of-view traverses said atmospheric limb region.

11. A method according to claim 10 wherein said known field-of-view has a vertical resolution that is less than approximately 10 kilometers when said known field-of-view is projected to said atmospheric limb region.

12. A method according to claim 9 wherein said gas is selected from the group consisting of carbon dioxide and oxygen.

13. A method according to claim 9 wherein said step of determining comprises the steps of:
- taking the logarithm of said signal profiles to form a corresponding plurality of logarithmic signal profiles;
- differentiating, with respect to altitude in said atmospheric limb region, each of said plurality of logarithmic signal profiles to form a corresponding plurality of differential logarithmic signal profiles; and
- using said plurality of differential logarithmic signal profiles to determine said temperature/pressure profile that is uniquely indicative of said signal profiles.

14. A method of calibrating an infrared sensing device, comprising the steps of:
- providing an infrared sensing device above the earth, wherein said infrared sensing device has a known field-of-view;
- scanning said infrared sensing device through a vertical angle such that said known field-of-view traverses an atmospheric limb region above the earth;
- measuring, using said infrared sensing device, a signal profile proportional to radiance emission from said atmospheric limb region in each of a plurality of spectral bandpass regions, wherein said radiance emission from each of said plurality of spectral bandpass regions is primarily due to a gas in said atmospheric limb region, said gas having a known mixing ratio as a function of pressure, wherein spectral opacity due to said gas is different for each of said plurality of spectral bandpass regions, and wherein, for at least one of said plurality of spectral bandpass regions, said. spectral opacity is non-linearly proportional to concentration of said gas in said atmospheric limb region over at least a portion of said signal profile;
- taking the logarithm of said signal profiles to form a corresponding plurality of logarithmic signal profiles;
- differentiating, with respect to altitude in said atmospheric limb region, each of said plurality of logarithmic signal profiles to form a corresponding plurality of differential logarithmic signal profiles;
- determining a temperature/pressure profile that is indicative of said signal profiles based on said plurality of differential logarithmic signal profiles, wherein said temperature/pressure profile is indicative of absolute radiance emission from said atmospheric limb region; and
- using said absolute radiance emission to calibrate said infrared sensing device.

15. A method according to claim 14 wherein said known field-of-view has a vertical resolution that is less than approximately 10 kilometers when said known field-of-view is projected to said atmospheric limb region.

16. A method according to claim 14 wherein said gas is selected from the group consisting of carbon dioxide, oxygen, nitrous oxide and methane.

17. A method according to claim 14 wherein said atmospheric limb region exhibits spherical uniformity at pressure levels within said atmospheric limb region.

18. A method according to claim 14 wherein said atmospheric limb region is selected from the group consisting of the stratosphere, troposphere and mesosphere.

* * * * *